United States Patent [19]

Bouiller et al.

[11] 4,415,310

[45] Nov. 15, 1983

[54] SYSTEM FOR COOLING A GAS TURBINE BY BLEEDING AIR FROM THE COMPRESSOR

[75] Inventors: Jean G. Bouiller, Brunoy; François E. G. Crozet, Yerres; Marcel R. Soligny, Chevilly-Larue, all of France

[73] Assignee: Societe Nationale d'Etude et de Construction de Moteurs d'Aviation, "S.N.E.C.M.A.", Paris, France

[21] Appl. No.: 309,210

[22] Filed: Oct. 6, 1981

[30] Foreign Application Priority Data

Oct. 8, 1980 [FR] France ................ 80 21454

[51] Int. Cl.³ .................. F01D 5/08
[52] U.S. Cl. .................. 416/95; 416/90 R; 415/115; 415/144; 60/726
[58] Field of Search .......... 416/90 R, 93 R, 95, 416/244 A; 415/144, 115; 60/726, 39.75

[56] References Cited

U.S. PATENT DOCUMENTS

| | | | |
|---|---|---|---|
| 1,574,859 | 3/1926 | Baumann | 416/93 |
| 2,618,433 | 11/1982 | Loos et al. | |
| 2,641,440 | 6/1953 | Williams | 416/90 |
| 2,833,514 | 5/1958 | Rainbow et al. | 415/115 |
| 3,281,116 | 10/1966 | Keenan | 416/244 A X |
| 3,609,059 | 9/1971 | Wagle | 416/95 |
| 3,897,168 | 7/1975 | Amos | 416/220 R X |
| 4,102,603 | 7/1978 | Smith et al. | 416/95 X |
| 4,127,988 | 12/1978 | Becker | 415/115 X |
| 4,231,704 | 11/1980 | Ayache et al. | 416/95 |

FOREIGN PATENT DOCUMENTS

| | | | |
|---|---|---|---|
| 1926423 | 12/1969 | Fed. Rep. of Germany . | |
| 2633222 | 1/1978 | Fed. Rep. of Germany . | |
| 966804 | 10/1950 | France . | |
| 1169048 | 12/1958 | France | 416/244 A |
| 2101178 | 3/1972 | France . | |
| 2292866 | 6/1976 | France . | |
| 712051 | 7/1954 | United Kingdom . | |
| 885951 | 1/1962 | United Kingdom | 416/95 |
| 1194663 | 6/1970 | United Kingdom | 416/95 |

Primary Examiner—Philip R. Coe
Assistant Examiner—Frankie L. Stinson
Attorney, Agent, or Firm—Oblon, Fisher, Spivak, McClelland & Maier

[57] ABSTRACT

A system for cooling a gas turbine by bleeding air from the compressor and channeling the air at the center of the engine towards the turbine in order to cool it. The air is bled from the plane of the disc bearing the blades of the compressor, said disc having radial ducts for the flow of the air. The invention is utilized in gas turbine engines to cool the turbine.

5 Claims, 5 Drawing Figures

SYSTEM FOR COOLING A GAS TURBINE BY BLEEDING AIR FROM THE COMPRESSOR

BACKGROUND OF THE INVENTION

1. Field of the Invention

The present invention concerns a system for cooling a gas turbine by bleeding air from the compressor.

2. Description of the Prior Art

In engines cooled by air from the interior of the high-pressure rotor, the cooling air is bled from the jet stream through ports made in the collars of the compressor drum.

These openings have the drawback of limiting the maximum permissible size of the collar's radius. Indeed, the collar is strongly acted upon by centrifugal force; if openings are made in it, in order to obtain the desired passage section, it is often necessary to increase the distance between two discs and therefore the length of the brace. This increase in the length of the brace, added to the effect of the shape coefficient due to the holes, raises the level of local stresses, in particular bending stresses, thus the necessity of reducing the diameter of the brace collars.

This restriction on the diameter of the collars leads to consequences in the technology of the elements in the jet stream and for the cooling output. With regard to the technology of the jet stream elements, this restriction on the diameter of the collars makes it impossible to make prismatic connections which are less costly than broached connections. Prismatic connections in fact induce high bending stresses on the disc, and in order to bring these stresses down to an acceptable level it is recommended that the brace collars be placed as high as possible towards the rim. As previously discussed, this arrangement is incompatible with the presence of cooling holes, which also generate major bending stresses. With regard to cooling, the size of the dead space leads to recirculations that perturb the cooling-air flow.

In order to give the air flow a certain minimum efficiency, it is necessary to accelerate the flow by means of centripetal gills or tubes.

SUMMARY OF THE INVENTION

The present invention has as an object a system making it possible to solve these drawbacks. According to the present invention, the cooling air for the turbine is introduced in the plane of the disc bearing the compressor blades.

According to one embodiment of the invention, the disc is monobloc and has radial ducts for the flow of cooling air.

According to another embodiment of the invention, the disc consists of two half-discs having radial grooves which, after assembly of the half-discs, constitute radial ducts for the flow of cooling air.

According to another characteristic of the invention, introduction of the air into the discs is achieved through ports made in the platforms of the blades attached to the discs.

This arrangement according to the invention, because of the holes being in the plane of the disc, makes it possible to increase the diameter of the collars, and to make use of prismatic connections for the blades, which allows a major loss in weight and a reduction in cost. Air bled from the platforms of the blades sucks in air at the maximum density and contributes to purifying the jet stream. Since the air is bled from the platforms, problems associated with relative stator-rotor movements that may perturb the flow are eliminated.

The system according to the invention makes it possible to eliminate problems of instability in the cooling flow associated with recirculations in the enclosure or dead space formed by the platforms and the collars.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
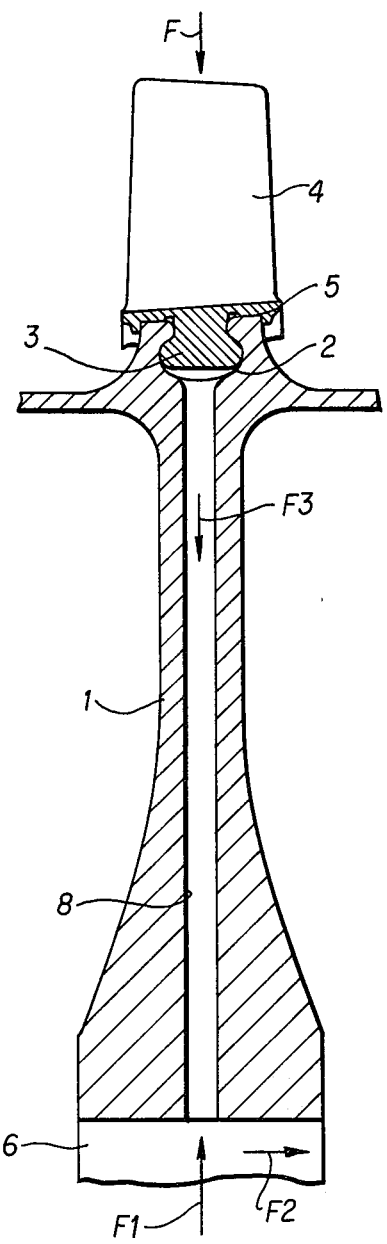
FIG. 1 is a radial cross-section view of one embodiment of a compressor disc according to the invention.
Figure 2:
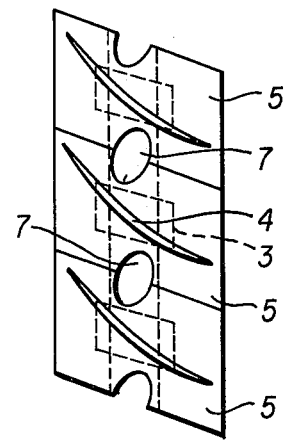
FIG. 2 is a view of the circumference of the disc and blades along the arrow F in FIG. 1.
Figure 3:
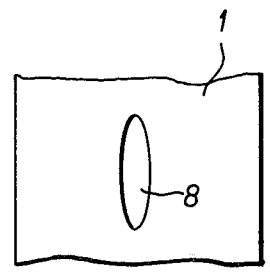
FIG. 3 is a view of the disc along the arrow F1 in FIG. 1.

In FIGS. 1, 2, and 3, a compressor disc 1 for a gas turbine engine has been shown with a groove 2 on its circumference in which are engaged the prismatic connection parts 3 and platforms 5 of the blades 4. Air is bled from the blades 4 of the compressor, and the air is then channeled through the central part 6 of the compressor along the arrow F2 towards the engine turbine.

According to the invention, the air is bled into the plane of the disc 1 through ports 7 formed in the platforms 5 of the blades. The ports 7 consists of mating half-scallops formed in the platforms 5 of two contiguous blades.

The ports 7 present an elliptical shape in cross section, in which the large axis is preferably perpendicular to the fluid flow.

The air is bled through the ports 7 and channeled along arrow F3 towards the central part 6 through radial ducts 8 which may be formed in the disc by electrolytic machining, electroerosion, etc. The radial ducts 8, which are angularly distributed along the entire circumference of the disc, are located in the plane of the disc 1. When the disc 1 has an even number of blades, machining of two diametrically opposite ducts 8 can be performed in a single pass.

Figure 4:
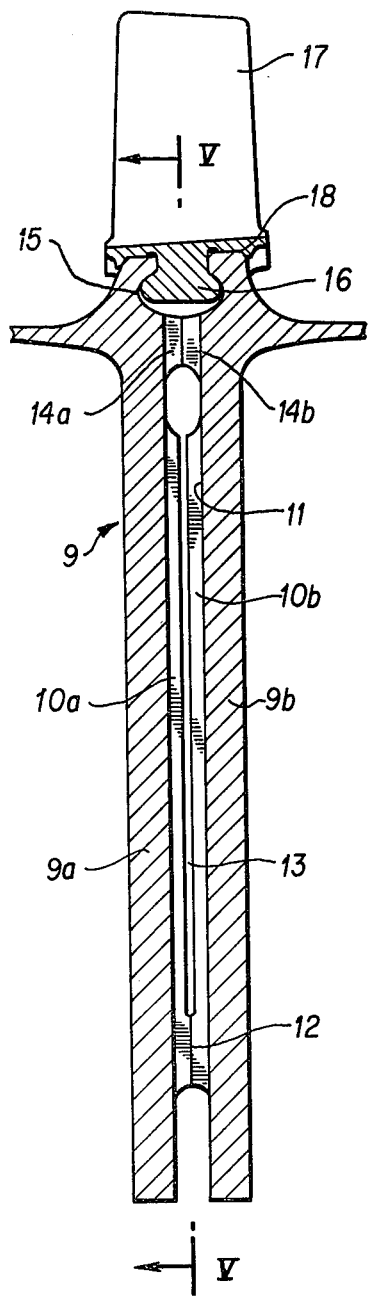
FIG. 4 is a radial cross-sectional view of another embodiment of the disc formed in two parts.
Figure 5:
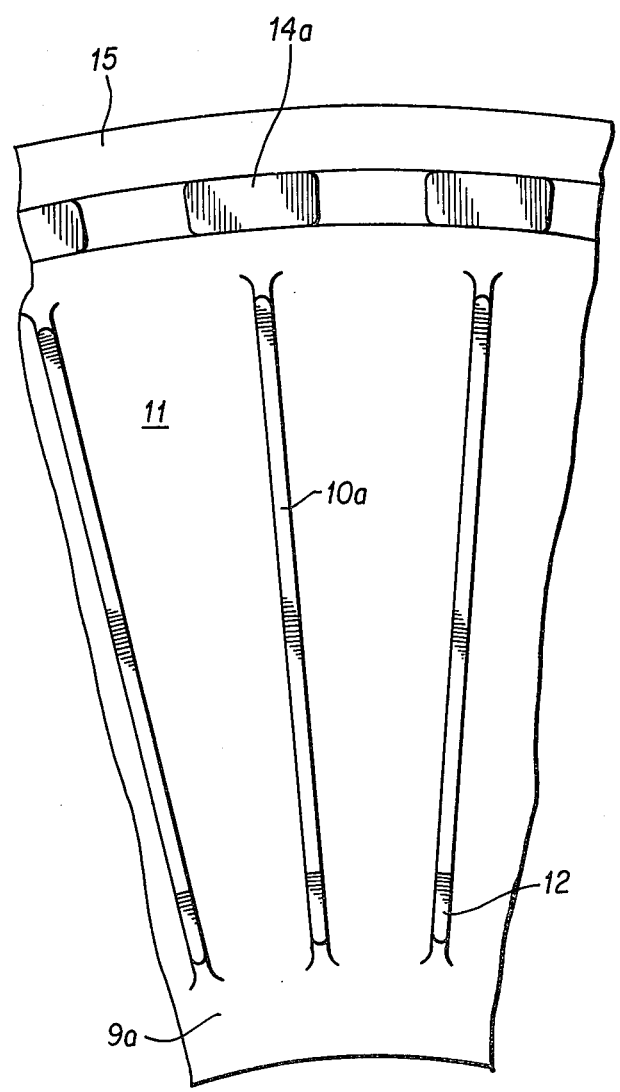
FIG. 5 is a sectional view along the line VV in FIG. 4.

In FIGS. 4 and 5, a compressor disc 9 is shown consisting of two half-discs 9a and 9b, the inner faces of which are machined so as to have radial ribs 10a and 10b creating radial passages 11 for cooling air therebetween.

The ribs 10a and 10b are in surface contact at the base of the disc at 12, and play 13 is provided between them for the remainder of their height.

Connection between the two half-discs, in particular by welding, is provided by the parts 14a, 14b at the level of the rim. When they are welded, the two half-discs are flat against one another at 12. Furthermore, in rotation the centrifugal force exerted on the disc by the blades creates a couple that tends to turn the half-discs around their center of gravity and to press them together even more in the support area 12. On its circumference, the disc has a circular groove 15 in which are engaged the prismatic connection parts 16 of the blades 17, the platforms 18 of which have ports between them to bleed air, like those shown at 7 in FIG. 2.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A system of bleeding air from a compressor for cooling a gas turbine element having at least one compressor blade bearing disc, said system comprising:
    at least one radial duct in each said disc, each said duct extending in the plane of a respective at least one said disc to the radially outer periphery thereof;
    platforms associated with said compressor blades and covering at least a portion of the radially outer periphery of each said disc; and
    ports formed in said platforms for each said at least one radial duct, wherein said ports are elliptical in cross section, the large axis of each said elliptical shape being perpendicular to the overall flow of fluid in said turbine, whereby air is channeled through said ports and said radial ducts into the center of said gas turbine towards said turbine element.

2. The system of claim 1 wherein each said at least one compressor disc is formed from a single block.

3. The system of claim 1 wherein each said at least one compressor disc comprises first and second axially spaced disc elements having radial grooves on facing surfaces, said facing surfaces being in at least partial mating contact, wherein corresponding pairs of said radial grooves form said radial ducts.

4. The system of claim 3 wherein said radial grooves are formed between projecting radial ribs on said facing surfaces of each said disc element, said facing surfaces being in contact only at the radially outer portions thereof and at the radially inner portions of said ribs.

5. The system of claim 1 wherein each said port comprises two mating half scallops in adjacent ones of said platforms.

* * * * *